US012097547B2

(12) United States Patent
Urrutia (10) Patent No.: US 12,097,547 B2
(45) Date of Patent: Sep. 24, 2024

(54) EXTRUSION PRESS AND METHOD OF USING (71) Applicant: GRAFTECH INTERNATIONAL HOLDINGS INC., Brooklyn Heights, OH (US)

(72) Inventor: Guillermo Urrutia, Navarra (ES)

(73) Assignee: GrafTech International Holdings Inc., Brooklyn Heights, OH (US)

( * ) Notice: Subject to any disclaimer, the term of this patent is extended or adjusted under 35 U.S.C. 154(b) by 0 days.

(21) Appl. No.: 17/261,984

(22) PCT Filed: Jul. 25, 2019

(86) PCT No.: PCT/US2019/043359
§ 371 (c)(1),
(2) Date: Jan. 21, 2021

(87) PCT Pub. No.: WO2020/023701
PCT Pub. Date: Jan. 30, 2020

(65) Prior Publication Data
US 2021/0260636 A1  Aug. 26, 2021

Related U.S. Application Data (60) Provisional application No. 62/703,150, filed on Jul. 25, 2018.

(51) Int. Cl.
*B29C 48/02* (2019.01)
*B21C 23/00* (2006.01)
(Continued)

(52) U.S. Cl.
CPC ............ *B21C 23/002* (2013.01); *B21C 23/08* (2013.01); *B21C 23/215* (2013.01); *B21C 27/00* (2013.01);
(Continued)

(58) Field of Classification Search
CPC ..... B21C 23/002; B21C 23/08; B21C 23/215; B21C 27/00; B21C 23/04; B29C 48/022;
(Continued)

(56) References Cited

U.S. PATENT DOCUMENTS 3,666,847 A * 5/1972 Bailey ................... B29C 48/022
264/108
3,689,188 A   9/1972 Kopp
(Continued)

FOREIGN PATENT DOCUMENTS

CN      1368928       9/2002
CN    101279331      10/2008
(Continued)

OTHER PUBLICATIONS

RU, Federal Service on Intellectual Property; Office Action and Search Report with English translation; Russian patent application serial No. 2021101594, 14 pages (Aug. 27, 2021).
(Continued)

*Primary Examiner* — Christopher M Rodd
*Assistant Examiner* — Shibin Liang
(74) *Attorney, Agent, or Firm* — Thompson Hine LLP (57) ABSTRACT

An extrusion press including a ram having a ram body configured for movement along a ram axis, and a compaction container defining a compaction compartment and having a compaction container axis. The compaction container is rotatable between a first orientation wherein the compaction container axis is not aligned with the ram axis and a second orientation wherein the compaction container axis is aligned with the ram axis such that the ram body is movable into the compaction compartment.

22 Claims, 12 Drawing Sheets (51) Int. Cl.
| | | |
|---|---|---|
| *B21C 23/08* | (2006.01) | |
| *B21C 23/21* | (2006.01) | |
| *B21C 27/00* | (2006.01) | |
| *B29C 48/00* | (2019.01) | |
| *B29C 48/25* | (2019.01) | |
| *B29K 307/04* | (2006.01) | |

(52) U.S. Cl.
CPC ........ *B29C 48/0011* (2019.02); *B29C 48/022* (2019.02); *B29C 48/266* (2019.02); *B29K 2307/04* (2013.01)

(58) Field of Classification Search
CPC .............. B29C 48/266; B29C 48/0011; B29K 2307/04; B29B 7/24; B29B 7/22; B29B 7/20
See application file for complete search history.

(56) References Cited

U.S. PATENT DOCUMENTS

| | | | | |
|---|---|---|---|---|
| 3,839,894 | A | | 10/1974 | Kent et al. |
| 3,898,831 | A | * | 8/1975 | Kahlefeld ............. B21C 23/212 |
| | | | | 72/263 |
| 4,536,359 | A | | 8/1985 | Tanaka |
| 4,557,190 | A | | 12/1985 | Vezzani |
| 4,787,308 | A | * | 11/1988 | Newsom ............... B30B 9/3078 |
| | | | | 100/232 |
| 4,862,721 | A | | 9/1989 | De Rush |
| 5,419,138 | A | | 5/1995 | Anderson et al. |
| 8,613,212 | B2 | | 12/2013 | Deplano et al. |
| 9,643,225 | B2 | | 5/2017 | Yakushigawa et al. |
| 2014/0373591 | A1 | | 12/2014 | Fraternale et al. |

FOREIGN PATENT DOCUMENTS

| | | | |
|---|---|---|---|
| CN | 101844415 | | 9/2010 |
| CN | 102597169 | | 7/2012 |
| CN | 102639462 | | 8/2012 |
| CN | 103079803 | | 5/2013 |
| CN | 106111988 | | 11/2016 |
| DE | 4041483 | | 6/1992 |
| GB | 440808 | | 1/1936 |
| GB | 625213 | | 6/1949 |
| GB | 910667 | | 11/1962 |
| JP | 47-3441 | | 1/1972 |
| JP | 47-38890 | | 12/1972 |
| JP | S49-44473 | | 11/1974 |
| JP | 64-20306 | | 2/1989 |
| JP | H02-182806 | | 7/1990 |
| JP | H11160503 | | 6/1999 |
| JP | 2003117697 | | 4/2003 |
| JP | 2005-34890 | | 2/2005 |
| JP | 2010215342 | | 9/2010 |
| JP | 2017081000 | * | 5/2017 .............. B29B 7/22 |
| RU | 2 152 835 | | 7/2000 |
| SU | 583930 | | 12/1977 |

OTHER PUBLICATIONS

EP, Extended European Search Report issued by the European Patent Office for European Patent Application No. 19841893.1 dated Feb. 1, 2022 (10 pages total).

PCT, United States Patent and Trademark Office (ISA/US), International Search Report and Written Opinion of the International Searching Authority, International Application No. PCT/US219/043359, 8 pages (Oct. 17, 2019).

Japan Patent Office, Notification of Reasons for Refusal issued in Japanese Patent Application No. 2021-503882 dated Jul. 4, 2023 with English translation (11 pages total).

Machine generated English translation of JP S49-44473, 5 pages (1974).

Machine generated English translation of JP H02-182806, 5 pages (1990).

Machine generated English translation of JP 2005-34890, 19 pages (2005).

China National Intellectual Property Administration; First Office Action and Search Report (with English translation) issued in Chinese Patent Application No. 201980049667.1 on Mar. 8, 2024; 24 pages.

European Patent Office; Examination Report issued in European patent application serial No. 19841893.1 on Sep. 18, 2023; 5 pages.

Japan Patent Office; Decision to Grant issued in Japanese Patent Application No. 2021-503882 on Dec. 19, 2023; 3 pages.

* cited by examiner

EXTRUSION PRESS AND METHOD OF USING

This application is a national stage filing of International Application No. PCT/US2019/043359 (published as International Publication No. WO 2020/023701), filed on Jul. 25, 2019 and entitled EXTRUSION PRESS AND METHOD OF USING, which claims priority to U.S. Provisional Patent Application Ser. No. 62/703,150, filed on Jul. 25, 2018 and entitled GREEN CARBON BODY EXTRUSION PRESS AND METHOD USING SAME. The entire contents of each of these applications is hereby incorporated by reference.

BACKGROUND

The present disclosure relates to an extrusion press for forming extruded bodies, such as green carbon bodies, and more specifically to an extrusion press having a compaction container assembly which is rotatable between a first or vertical orientation for loading and a second or horizontal orientation for extruding.

Graphite electrodes are a necessary consumable in an electric arc furnace and are able to withstand the extremely harsh operating environment of the electric furnace steelmaking operation. Graphite electrodes are typically manufactured by forming cylindrical green carbon bodies. The green carbon bodies are typically formed by mixing and kneading raw materials including coke, such as powdered needle coke, and binder pitch at a high temperature. The raw material mixture is then extruded from a press to form an extruded green carbon body. The green carbon body is subsequently graphitized to form the graphite electrode.

SUMMARY

In one embodiment the present disclosure is directed to a system and method for improved extrusion. More particularly, in one embodiment the invention is an extrusion press including a ram having a ram body configured for movement along a ram axis, and a compaction container defining a compaction compartment and having a compaction container axis. The compaction container is rotatable between a first orientation wherein the compaction container axis is not aligned with the ram axis and a second orientation wherein the compaction container axis is aligned with the ram axis such that the ram body is movable into the compaction compartment.

BRIEF DESCRIPTION OF THE DRAWINGS

The structure and certain embodiments can be understood by reference to the accompanying drawings, in which.

DETAILED DESCRIPTION

Figure 1:
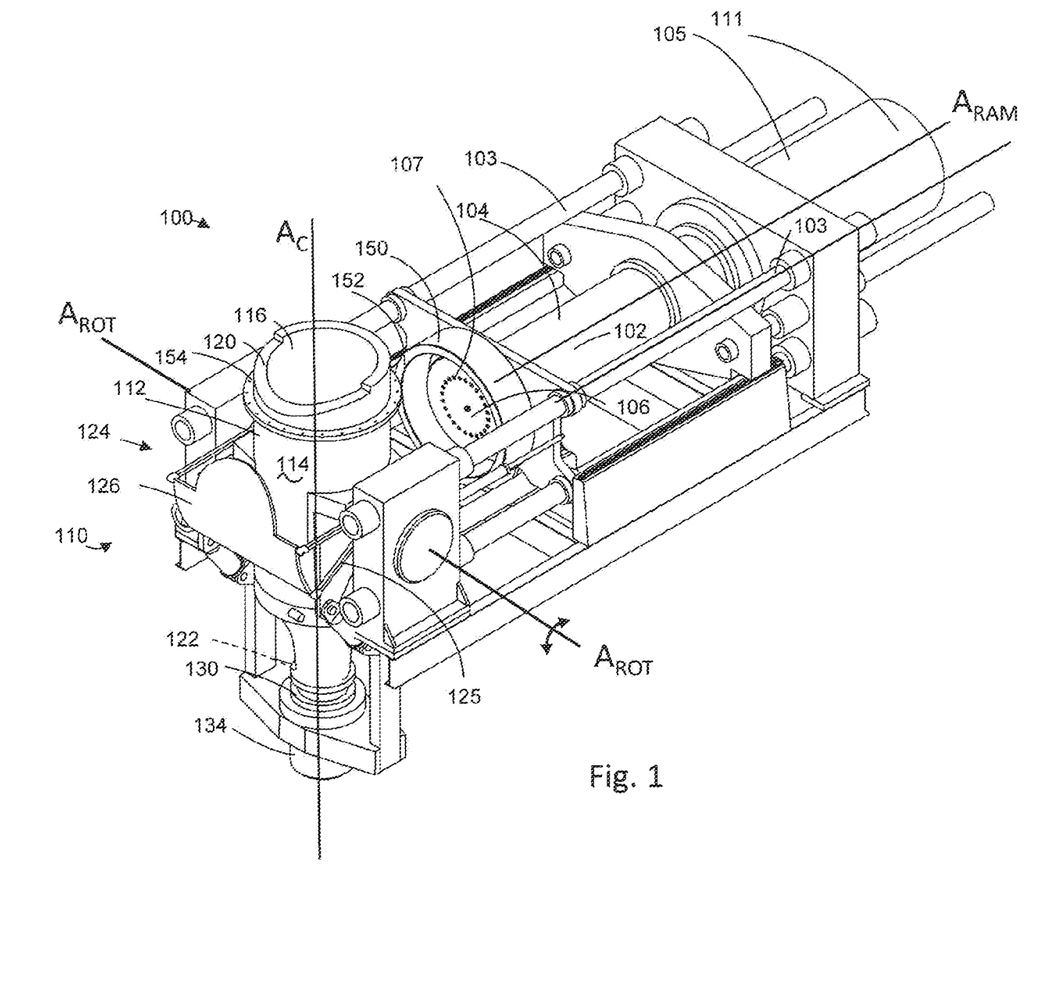
FIG. 1 is a perspective view of one embodiment of an extrusion press, with the compaction container assembly in a vertical orientation.
Figure 2:
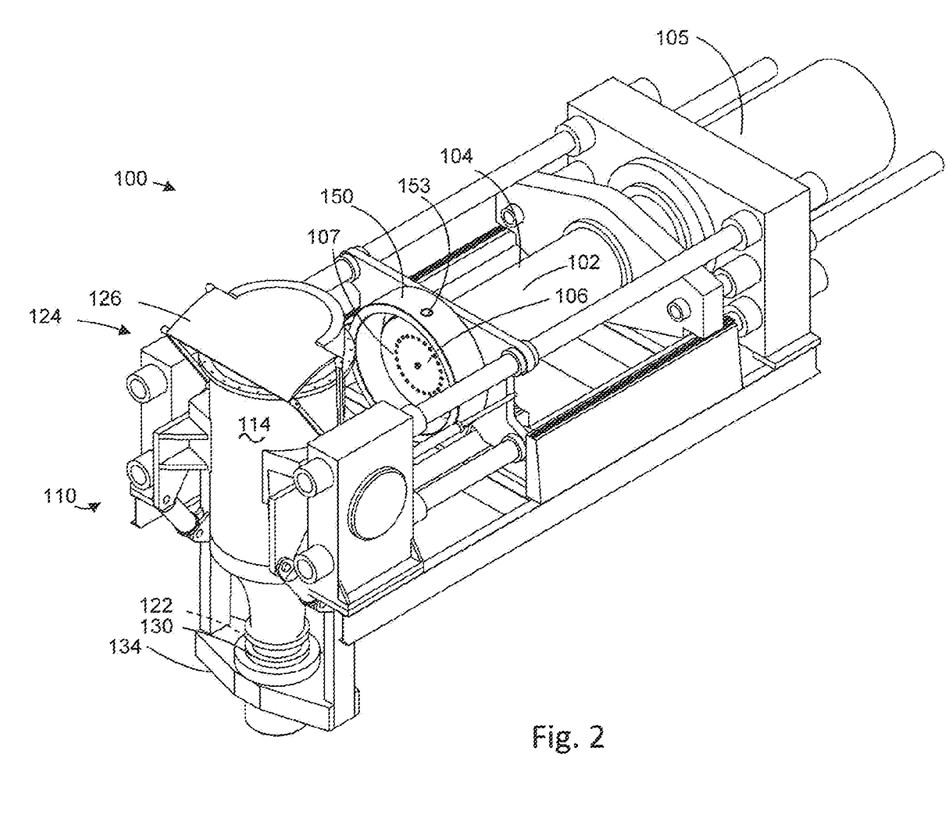
FIG. 2 is a perspective view of the extrusion press of FIG. 1, with the lid in a closed position.
Figure 3:
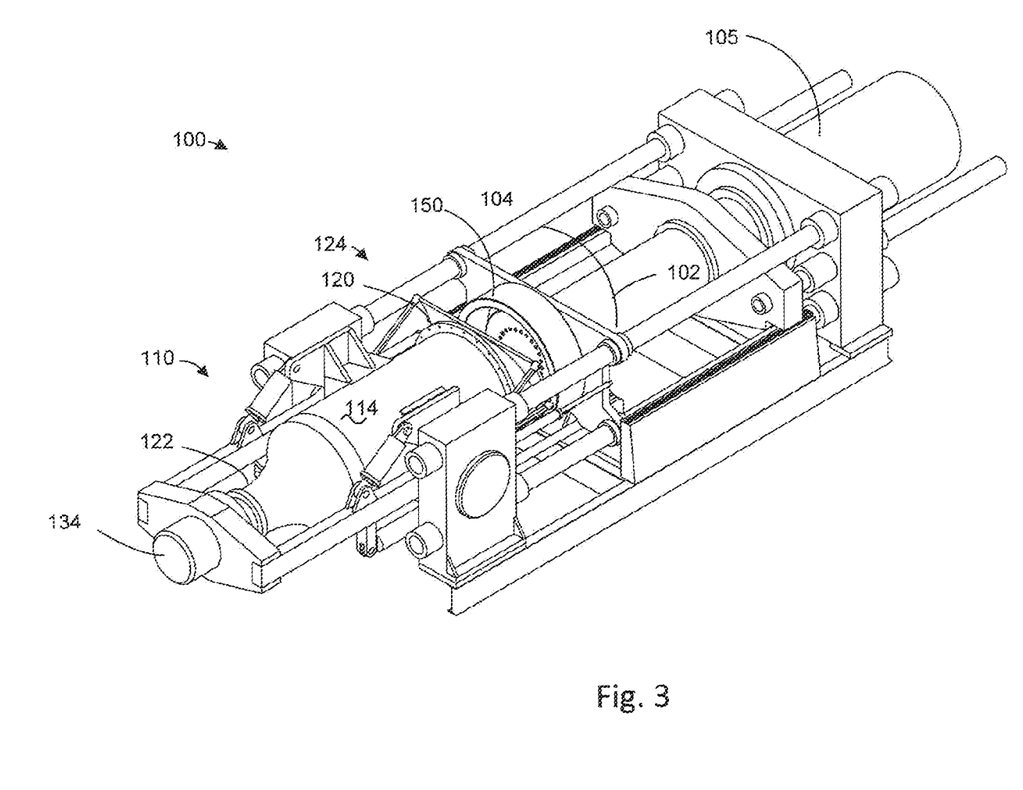
FIG. 3 is a perspective view of the extrusion press of FIG. 1 with the compaction container in a horizontal orientation.

Referring now to FIGS. 1-3, an extrusion press is shown generally at 100. The extrusion press includes a hydraulic ram or extrusion ram 102, which includes a hollow ram casing 105 receiving a ram body 104 therein. The ram 102 is, in the illustrated embodiment maintained in a generally horizontal orientation (with respect to a gravitational frame of reference) such that the ram body 104 is configured for axial movement in the horizontal direction. In the illustrated embodiment the ram casing 105 has an annular shape defining a cylindrical inner cavity, and the ram body 104 has a generally cylindrical shape (e.g. having a circular cross section) such that the ram body 104 is closely received in the ram casing 105. However the ram body 104 and ram casing 105 can instead have other shapes, including shapes other than circular in cross section.

The ram body 104 can be moved forwardly and/or rearwardly in the horizontal direction using, for example, pressurized hydraulics (shown schematically at 111) operatively coupled to the ram casing 105 so that the ram body 104 can extrude material as described in further detail below. The extrusion press 100 can include auxiliary cylinders 103 coupled to the ram 102 and/or ram body 104 for moving the ram body 104 along the axial direction via, for example, electrical power, or via a separate hydraulic circuit, when hydraulic pressure is not applied to the ram 102 through the ram casing 105.

Figure 4:
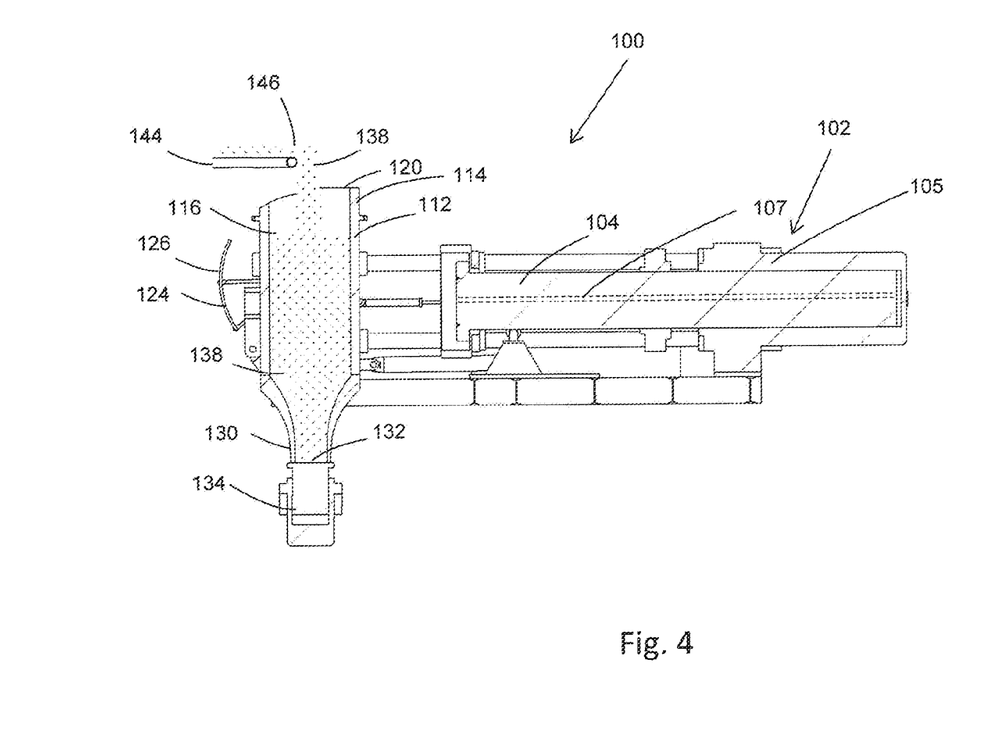
FIG. 4 is a side cross-sectional view of the extrusion press of FIG. 1 illustrating the loading of the compaction container, and with a particular ram body configuration.
Figure 9:
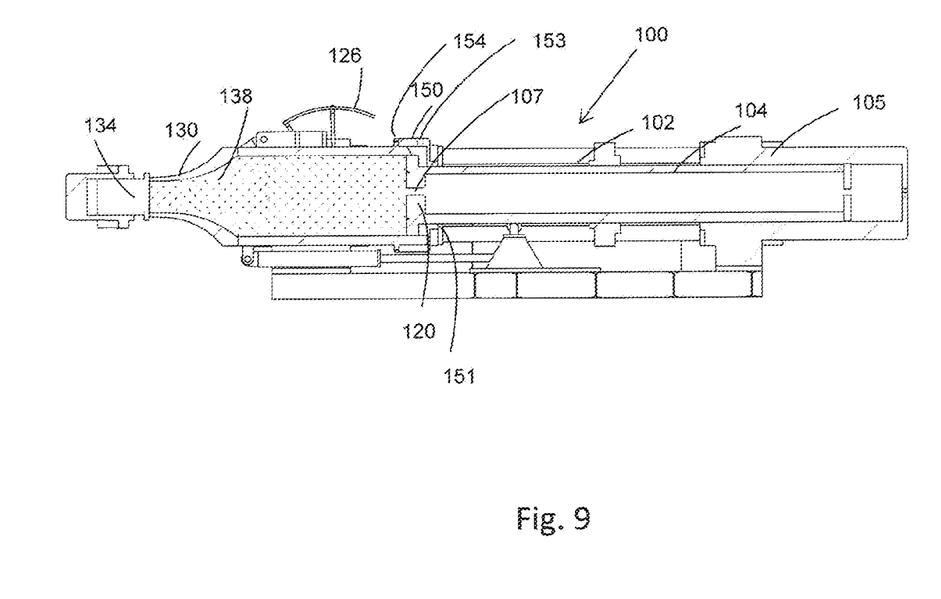
FIG. 9 shows the extrusion press of FIG. 8, with the vacuum shroud advanced forwardly, and with a particular ram body configuration.

The ram 102/ram body 104/ram casing 105 have a longitudinal axis $A_{RAM}$ disposed in a horizontal orientation. The ram body 104 includes a ram face or end face 106 disposed at a first end thereof and aligned in a radial plane. The ram body 104 can include a series of nozzles or openings 107 extending through the ram body 104 and terminating at the ram face 106, as shown in FIG. 1. In one case the nozzles 107 can be pressure activated—e.g. remain closed except when exposed to sufficient pressure. FIG. 4 illustrates one of the nozzles 107 extending through the ram body 104, although the nozzles 107 can have any of a wide variety of configurations and paths. As an alternate embodiment FIG. 9 illustrates the ram body 104 as being hollow and having an inner cavity which fluidly communicates with nozzle 107. The nozzles 107 can have various other shapes and configurations beyond that shown. The upstream end of the nozzles 107 can be coupled to a fluid source (not shown) such as a compressed air source and operate as described in further detail below. Moreover, if desired it may be possible to draw a vacuum through the nozzles 107 as described below.

The press 100 includes a compaction container assembly 110 which includes a compaction container 112 having a wall 114 (such as a cylindrical wall 114) defining a compaction compartment 116 within. The compaction container assembly 110/container 112 extend and are oriented along a longitudinal container axis $A_c$, and have a first opening or first open end 120 and a second opening or second open end 122 disposed opposite the first open end 120. The compaction container assembly 110/container 112 are rotatably mounted to the remainder of the press 100 and/or the ram 102 such that the compaction container assembly 110/container 112 are rotatable about a horizontal axis of rotation $A_{ROT}$ as described in further detail below.

Figure 5:
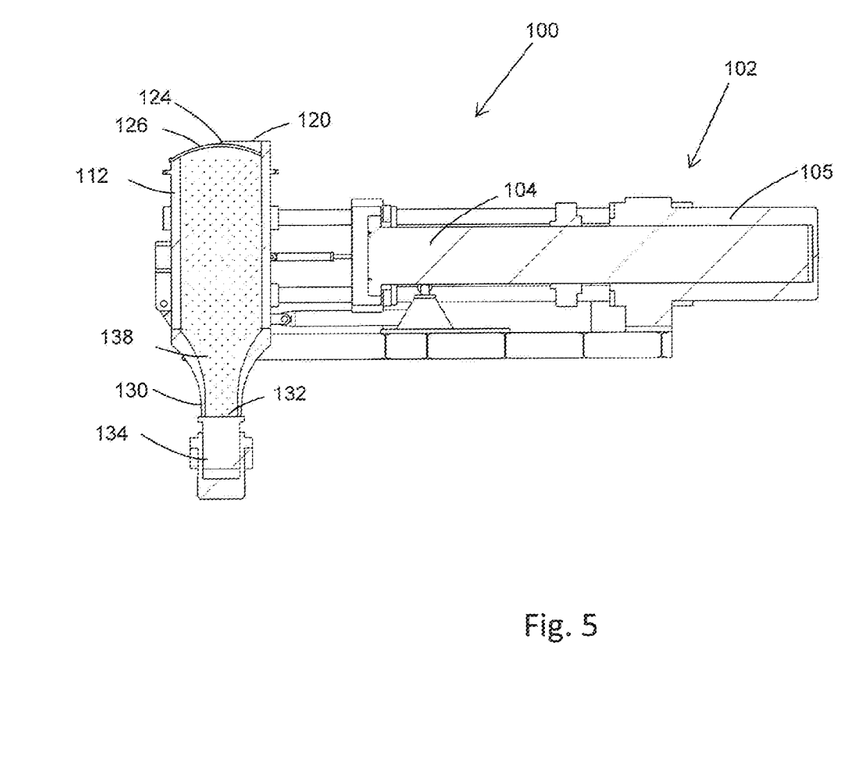
FIG. 5 is a side cross-sectional view of the extrusion press of FIG. 2.
Figure 12:
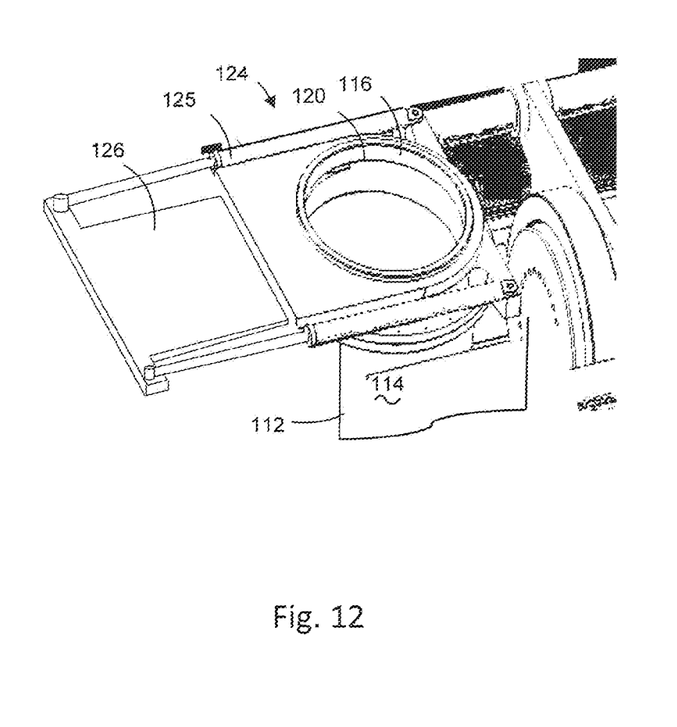
FIG. 12 is a perspective view of the upper part of the compaction container, illustrating an alternate embodiment of the container assembly valve.

The compaction container assembly 110 also includes a valve assembly 124 at or adjacent to the first open end 120. The valve assembly 124 has an actuator 125 operably connected to a lid 126 for moving the lid 126 between a closed position wherein the lid 126 engages and sealingly covers the first open end 120, as shown in FIGS. 2 and 5, and an open position, as shown in FIGS. 1 and 4, wherein the lid 126 does not engage or cover the first open end 120 such that the first open end 120 is uncovered. The embodiment of FIGS. 1-11 show the valve assembly 124 as including or taking the form of a rotating valve (also known as a swing valve) in which the lid 126 rotates about an axis between the open and closed positions. However the valve assembly 124 can include or take the form of various other types of valve assemblies, including but not limited to a gate valve or a sluice valve as shown in FIG. 12 in which the lid 126 is generally flat and planar, and slides open and closed along the plane. The valve assembly 124 including the actuator 125 and lid 126 rotate together with the compaction container assembly 110/container 112 as they rotate about the axis of rotation $A_{ROT}$.

Figure 10:
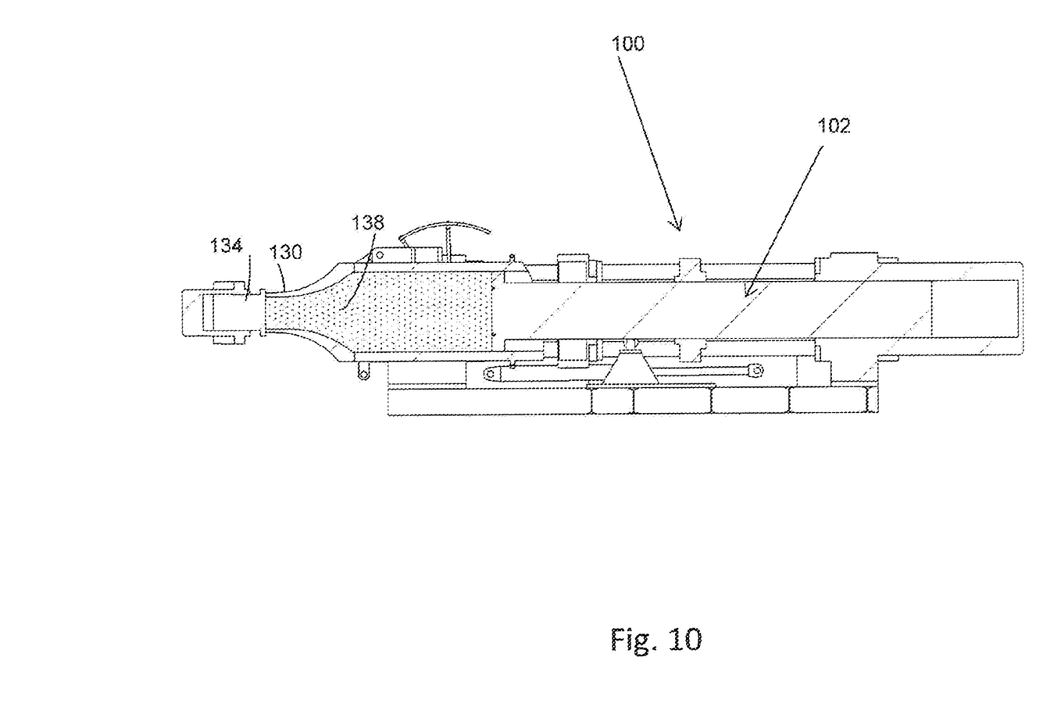
FIG. 10 shows the extrusion press of FIG. 9 with the vacuum shroud retracted and the ram body advanced forwardly.
Figure 11:
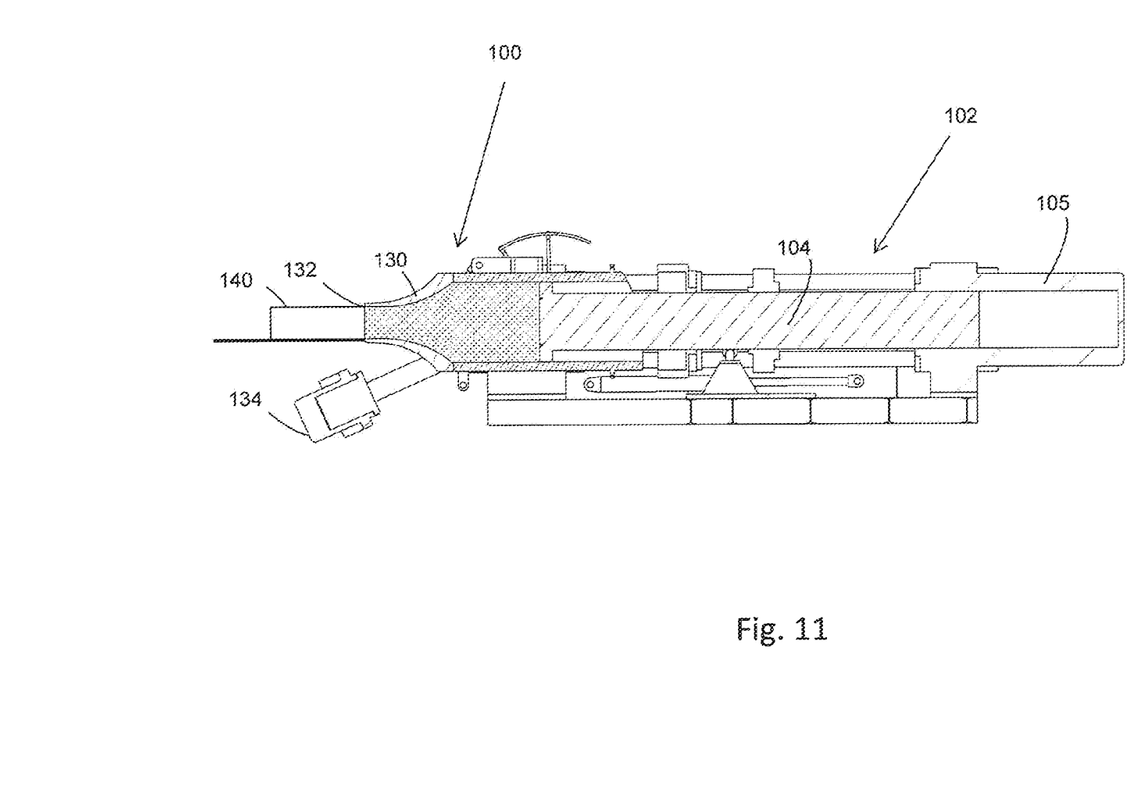
FIG. 11 shows the extrusion press of FIG. 10 with the ram body advanced forwardly and extruding a body.

The compaction container assembly 110 can also include a die 130 disposed at the second open end 122 of the compaction container assembly 110. The die 130 has a die opening 132, through which the material 138/extruded article 140 is forced during the extrusion process, as shown in FIG. 11 and as described in further detail below. The compaction container assembly 110 can include a die cover 134 is disposed at the second open end 122 adjacent to the die 130. The die cover 134 is movable between a closed position and an open position. The die cover 134 sealingly engages or covers the die opening 132 when in the closed position, as shown in FIGS. 1-10. When the die cover 134 is in the open position as shown in FIG. 11, the die cover 134 is spaced away from and does not cover the die opening 132, to allow the material to be extruded from the die 130 as described in further detail below. The die 130 and die cover 134 rotate together with the compaction container assembly 110/container 112 as they rotate about the axis of rotation $A_{ROT}$, as described in further detail below:

The press 100 also includes a generally annular vacuum shroud 150 disposed concentrically about and coaxial with the ram body 104. The vacuum shroud 150 has an annular front face 152 that is adapted to sealingly engage a flange or mating surface 154 (FIGS. 1, 8 and 9) positioned at or adjacent to the first open end 120 of the container 112. The flange or mating surface 154 is positioned on an outer surface of the container 112, and spaced slightly downstream from the first open end 120 in the illustrated embodiment. The vacuum shroud 150/face 152 is movable along the ram axis $A_{RAM}$ between a retracted position in which the vacuum shroud 150/face 152 are spaced apart from and do not engage the mating surface 154, and a sealing or engaged position in which the vacuum shroud 150/face 152 sealingly engage the mating surface 154 for drawing a vacuum in the container 112, as will be described in further detail below:

As noted above, the compaction container assembly 110 and container 112 are rotatable about the axis of rotation $A_{ROT}$, between a first or vertical orientation wherein the container axis $A_c$ is oriented generally or strictly vertically and the first open end 120 is positioned above the second open end 122, as shown in FIGS. 1, 2, 4 and 5, and a second or horizontal orientation wherein the container axis $A_c$ is oriented generally or strictly horizontally and the first open end 120 is generally aligned with the second open end 122 as shown in FIGS. 3 and 6-11. When the compaction container assembly 110 is first moved to the horizontal orientation the first open end 120 is positioned adjacent to, and faces, the ram face 106, and the container axis $A_c$ is aligned with the longitudinal axis $A_{RAM}$ of the ram body 104. The amount of rotation of the container assembly 110/container 112 is about 90 degrees in the illustrated embodiment, but is at least about 45 degrees in one case or can vary as desired. The axis of rotation $A_{ROT}$ can in one case be oriented perpendicular with respect to the ram axis AR, as shown in FIG. 1, but the axes of rotation can be at varying different angles if desired.

Referring now to FIGS. 4-11, one method for operating of the press 100 is now described. The container assembly 110 begins in, or is rotated to, the first or vertical orientation, as shown in FIG. 4, and arranged such that lid 126 is in its open position and the die cover 134 is closed. The container assembly 110 is secured, locked or blocked into this first orientation. In this orientation the first open end 120 is positioned above the second open end 122 such that raw material 138 to be extruded, such as green carbon raw material 138, can be easily loaded into the container 112. The raw material 138 can be loaded into the container 112 in any suitable known manner, such as for example by conveyer 144 shown in FIG. 4 having an end 146 disposed above the first open end 120 such that the raw material 138 is naturally fed into the container 112, and retained therein, by gravity. In one case the raw material 138 is green carbon raw material 138 used to form an extruded green carbon body and includes coke, such as for example needle coke, calcined petroleum coke, calcined anthracite and binder, such as for example pitch, coal tar pitch or petroleum pitch. The green carbon raw material 138 is mixed and kneaded at a high temperature and then loaded into the first open end 120 of the container 112.

Figure 6:
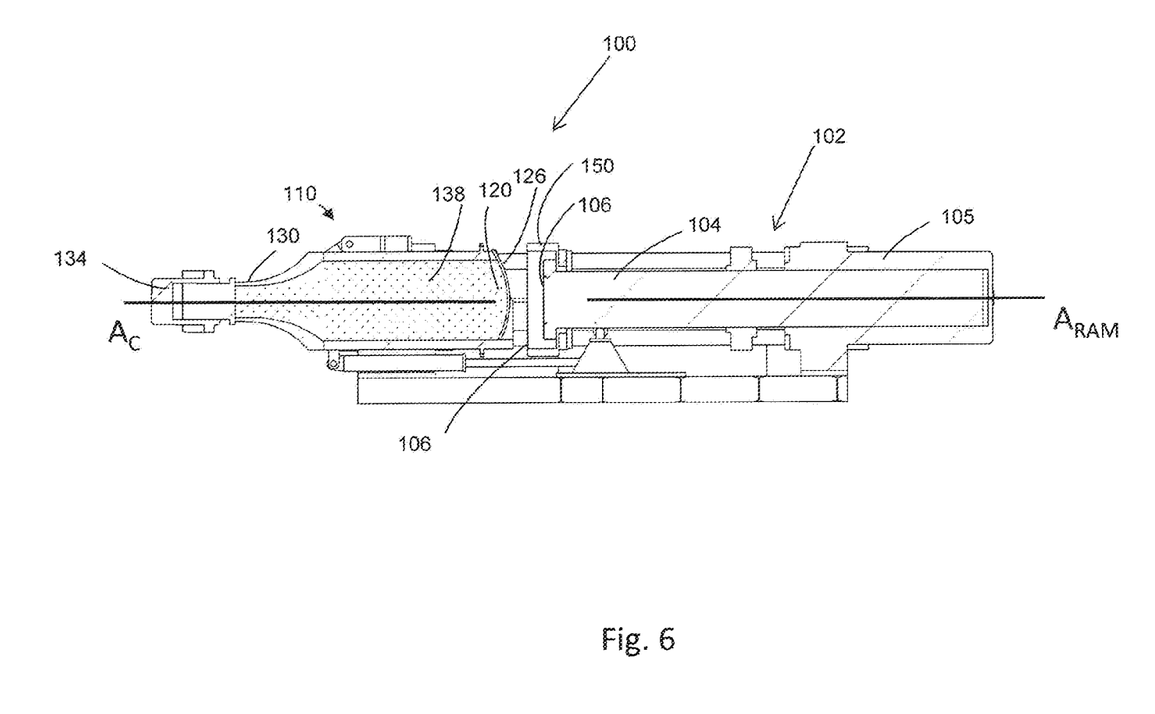
FIG. 6 is a side cross-sectional view of the extrusion press of FIG. 3.

After the desired amount of material 138 has been loaded into the container 112, the valve assembly 124 is closed, thereby moving the lid 126 to the closed position to sealingly cover the first open end 120, as shown in FIG. 5. The container assembly 110/container 112 is then released, unlocked or unblocked and rotated (90° in one case) about axis $A_{ROT}$ until the container assembly 110/container 112 is in the second or horizontal orientation, such that container axis $A_c$ is aligned with the axis $A_{RAM}$ of the ram body 104, as shown in FIG. 6. When the container assembly 110 is in the horizontal orientation, the first open end 120 and/or lid 126, faces, and is adjacent or immediately adjacent to, the ram face 106. The vacuum shroud 150 and ram body 104 are sufficiently retracted at this stage to allow the compaction container assembly 110 to freely rotate to its horizontal orientation. As described above, the valve assembly 124/lid 126 and die cover 134 rotate with the container 112. The container assembly 110/container 112 is then secured, locked or blocked in the horizontal orientation to prevent movement of the container assembly 110/container 112 during the subsequent steps, such as during extrusion.

Figure 7:
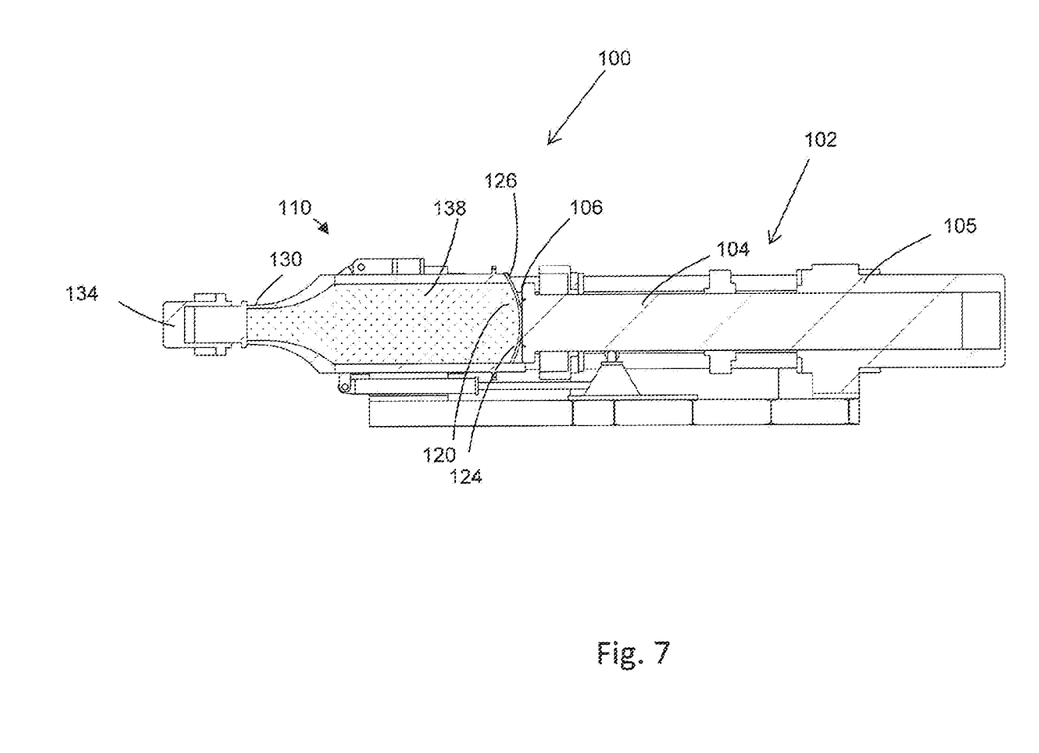
FIG. 7 shows the extrusion press of FIG. 6, with the ram body advanced forwardly.

Referring now to FIG. 7, the ram body 104 is moved forward from its retracted position to an external position where the ram face 106 is positioned proximate, near, adjacent or immediately adjacent to the lid 126. The valve assembly 124 is then opened, moving the lid 126 away from the first open end 120 to the open position. In this position, the ram face 106 retains the material 138 within the container 112 preventing most of the material 138 from spilling out of the first open end 120 of the container 112. The maximum size of the gap between the ram face 106 and the first open end 120/container 112 at this stage may be relatively small to reduce or minimize spilling, such as less than about 7.5 cm in one case, or less than about 5 cm in one case, or less than about 2 cm in another case.

Figure 8:
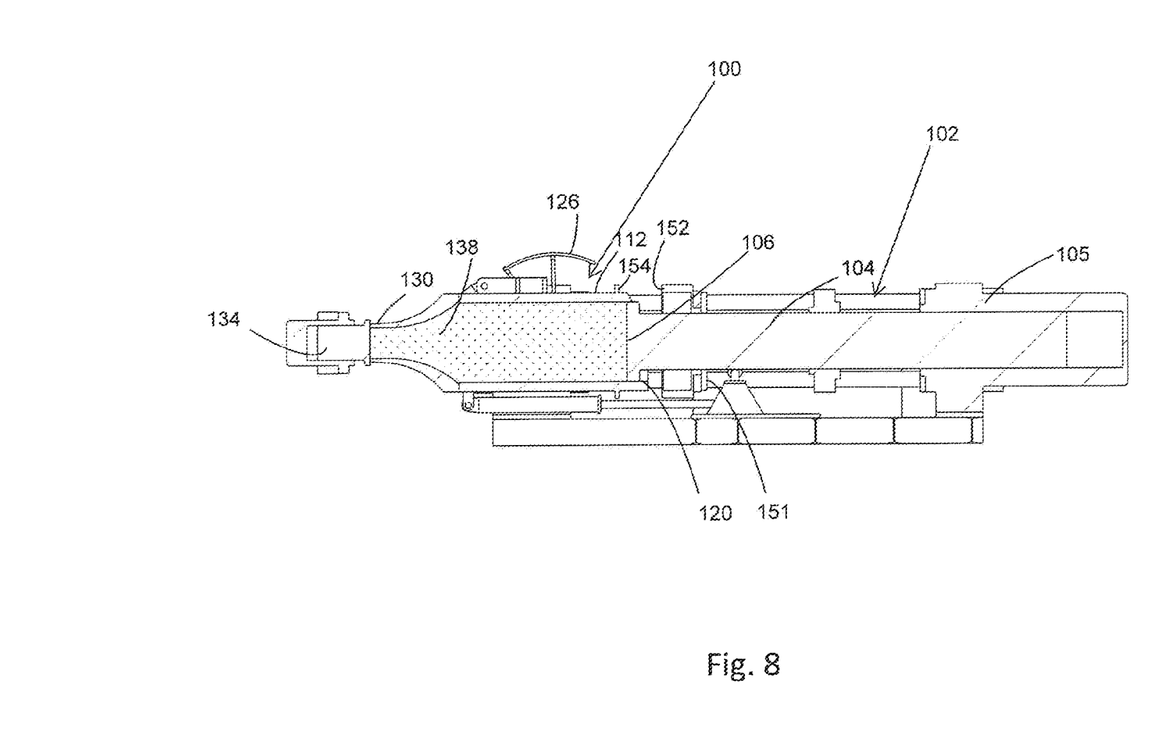
FIG. 8 shows the extrusion press of FIG. 7, with the lid opened and the ram body advanced forwardly.

Referring now to FIG. 8, the ram body 104/ram face 106 is then advanced from a position at least partially external to but proximate to the container 112, to a first internal position in which the ram body 104/ram face 106 fully enters the container 112 through the first open end 120, and is partially positioned in the casing 105 without compacting, or without significantly compacting, the raw material 138. For example, in this step the ram body 104 may extend less than 10%, or in another case less than 5%, or in yet another case less than 1%, of the axial length of the container 112.

The vacuum shroud 150 is then moved towards the container 112 until the shroud 150/shroud face 152 is in a sealing position where the shroud 150/shroud face 152 sealingly engage the mating surface or flange 154 of container 112 as shown in FIG. 9. The shroud 150 including an inner sealing member 151 that closely, slidably and sealingly receives the ram body 104 therein. The shroud 150 thus generally closes and seals the container 112 and compaction compartment 116 so that a vacuum can be drawn in the container 112 and compaction compartment 116. A vacuum cycle is then performed by drawing a vacuum within the vacuum shroud 150 and to remove air in the container 112/compaction compartment 116. In one embodiment, vacuum shroud 150 has one or a plurality of radially-extending openings 153 (FIGS. 3 and 9) to which a vacuum source can be coupled to draw down the vacuum. However the vacuum can be formed by various other methods such as possibly in one case applying a vacuum via the nozzles 107. The vacuum can help to facilitate the compaction process as described in the next step.

When a desired level of vacuum is reached (in one case less than about 10 kPA, or in another case less than about 2 kPA), a compaction cycle is performed wherein the raw material 138 is compacted without extruding the material 138 through the die 130. During the compaction cycle, the ram 102 is moved from the first internal position towards and into the container 112/raw material 138 to compact the material 138 in container 112 while the die cover 134 remains closed, as shown in FIG. 10. For example, in this step the ram body 104 may extend less than 25%, or in another case less than 10%, or in yet another case less than 5%, of the axial length of the container 112, and may extend at least about 1%, or in another case at least about 5% of the axial length of the container 112. The compaction process helps to eliminate voids in the extruded material and provide a more uniform extruded product. Upon completion of compaction, the vacuum shroud 150 is retracted, thereby moving the shroud face 152 away from the container mating surface 154 and breaking the vacuum.

The die cover 134 is then moved to the open position to uncover the die opening 132 and the extrusion commences by moving the ram body 104 further into the container 112 as shown in FIG. 11. The ram body 104 is extended into the container 112 and the raw material 138 is extruded through the die opening 132 to form an extruded article 140, such as an extruded green carbon article 140. The extrusion process can be carried out at various temperatures and pressures, and in one case between about 90 degrees Celsius and about 130 degrees Celsius, and in one case at a pressure of about least about 20 bar in one case, or at least about 50 bar in another case, or at least about 150 bar in yet another case. The extruded article 140 can be cut away or otherwise separated from the press 100 and further processed, such as by graphitizing, to form the graphite electrode for use an electric arc furnace.

Upon completion of the extrusion step, the ram body 104 is retracted away from the die opening 132. Air or some other fluid can be sprayed against the material 138 within the container 112 via the nozzles 107 in the ram face 106 before or as the ram body 104 is retracted from within the container 112. The sprayed air acts as a release and prevents the raw material 138 from sticking to the ram face 106, which is known as the stick effect. A source of compressed air can be fluidly coupled to the upstream end of the nozzles 107 to provide the sprayed air. The die cover 134 can also move to its closed position as the ram 102 is retracted from the container 112. The ram body 104 is then retracted out of the container 112 until it is fully retracted out of the container assembly 110/container 112. The container assembly 110/container 112 is then rotated about the axis of rotation $A_{ROT}$ back to the first or vertical orientation where it is ready to be loaded again with the raw material 138 as shown in FIG. 4.

It should be noted that although the figures and description show the container assembly 110/container 112 being rotated between a vertical orientation, where it is loaded, to a horizontal orientation, where extrusion takes place, the container assembly 110 can be rotated through various different angles and oriented in differing positions. In addition, the loading process can be carried out at various orientations other than vertical, and the extrusion process can be carried out at various orientations other than horizontal. The rotatable nature of the container assembly 110 allows freedom in separating the orientation of loading from the orientation of extrusion. In the particular illustrated embodiment, the ability to load in the vertical direction, and then move to the horizontal direction, enables the ram body 104 to perform both the compaction and the extrusion, in one case in the horizontal configuration. This avoids the need to use a separate component, device or mechanism to provide compaction of the raw material 138, which enables faster processing and the elimination of additional equipment and steps. Thus such a separate compacting component, device or mechanism can be lacking from the press 100 or excluded from the press 100.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. A method of extruding comprising:
   accessing an extrusion press including a compaction container defining a compaction compartment and having a compaction container axis, wherein the extrusion press further includes a ram having a ram body configured for movement along a ram axis;

loading material into the compaction compartment though a first open end thereof when the compaction container is in a first orientation wherein the compaction container axis is not aligned with the ram axis;

covering the first open end; and while the first open end remains covered, rotating the compaction container to a second orientation wherein the compaction container axis is aligned with the ram axis such that the ram body is movable into the compaction compartment.

2. The method of claim 1 further comprising the step of moving the ram body into the compaction compartment to thereby extrude material out of the compaction container.

3. The method of claim 1 wherein the compaction container has a second open end positioned opposite to the first open end, wherein when the compaction container is in the first orientation the first open end is positioned above the second open end, wherein when the compaction container is in the second orientation the first open end and second open end are generally horizontally aligned, and wherein when the compaction container is in the second orientation the first open end is positioned adjacent to the ram body.

4. The method of claim 3 wherein the second open end is closed during the loading step, and wherein the method further includes, after the rotating step, uncovering the first open end and the second open end and moving the ram body into the compaction compartment to thereby extrude material out of the compaction container.

5. The method of claim 4 wherein the method further includes, after the rotating step but before uncovering the first open end, moving the ram body to a position immediately adjacent to the first open end.

6. The method of claim 1 further including the step of, after the rotating step, moving the ram body partially into the compaction compartment to compact the material while not extruding the material.

7. The method of claim 6 wherein a vacuum is applied to the compaction compartment while the ram body compacts the material.

8. The method of claim 1 wherein the extrusion press includes a lid that covers the first end during the covering step, and wherein the lid is rotatably coupled to the compaction compartment such that the lid rotates with the compaction container during the rotating step.

9. The method of claim 1 wherein the ram is not rotatably coupled to the compaction container such that the ram does not rotate with the compaction container during the rotating step.

10. The method of claim 1 wherein during the rotating step the compaction container rotates about an axis that is oriented generally perpendicular to the ram axis, wherein the first orientation is a generally vertical orientation and the second orientation is a generally horizontal orientation.

11. The method of claim 1 further comprising the steps of at least partially moving the ram body into the compaction container while a second open end is covered to thereby compress and not extrude material positioned in the compaction compartment, and further moving the ram body in to the compaction container while the second open end is not covered to thereby extrude material out of the compaction container.

12. The method of claim 1 wherein the wherein the compaction container further includes a second open end, wherein the first open end and the second open end are both located on opposite axial ends of the compaction container, and wherein during the loading step material is loaded into the compaction compartment in an axial direction aligned with the compaction container axis.

13. A method of extruding comprising:

accessing an extrusion press including a compaction container defining a compaction compartment, wherein the extrusion press further includes a ram having a ram body configured for movement along a ram axis, the container having a first open end and a second open end at an opposite end of the container relative to the first open end, the extrusion press having a die with a die opening having a cross sectional area smaller than a cross sectional area of the compaction compartment in fluid communication with the compaction compartment;

loading material into the compaction compartment;

covering the first open end;

while the first open end remains covered, rotating the compaction container from a vertical orientation to a horizontal orientation;

at least partially moving the ram body into the compaction compartment to compress the material positioned therein without extruding the material while at least one of the die or the die opening is closed to prevent extrusion and allow compaction of the material; and further moving the ram body into the compaction container to thereby extrude material, out of the compaction container and through the die.

14. The method of claim 13 wherein the ram body is positioned in the first open end in both moving steps, and wherein the second open end, the die and the die opening are not closed during the second moving step.

15. The method of claim 13 wherein the first moving step includes inserting the ram body into the compaction compartment at least about 1% of an axial length of the container.

16. The method of claim 13 wherein the at least one of the die or the die opening is entirely closed by a lid during the first moving step.

17. The method of claim 13 wherein the material is extruded through the die opening when exiting the compaction container, and wherein the die opening is closed by a lid that is removably placeable over the die opening during the at least partially moving step.

18. The method of claim 17 wherein the die opening is an axially-outermost opening of the die in a downstream axial direction, where the downstream axial direction is defined by a direction through which the material is extruded.

19. The method of claim 13 wherein, during the at least partially moving step, the at least one of the die or the die opening is closed by a lid that is at least partially positioned outside of the compaction container in an axial direction.

20. An extrusion press comprising:

a ram having a ram body configured for movement along a ram axis;

a compaction container defining a compaction compartment and having a compaction container axis, wherein the compaction container has a first open end and a second open end positioned opposite to the first open end, wherein the compaction container is rotatable between a first orientation wherein the compaction container axis is not aligned with the ram axis such that material can be loaded into the compaction compartment through the first open end and a second orientation wherein the compaction container axis is aligned with the ram axis such that the ram body is movable into the compaction compartment, wherein when the compaction container is in the first orientation the first open end is positioned above the second open end; and a lid coupled to the compaction container and configured to move to a closed position to cover the first open end while the compaction container moves from the first orientation to the second orientation, wherein the lid is configured such that when the lid is in the closed position the lid generally covers the first open end to retain material in the compaction container.

21. The press of claim 20 wherein the lid is movable to an open position wherein the lid does not generally cover the first open end to enable the ram body to be moved into the compaction container when the compaction container is in the second orientation, and wherein the lid is configured to retain material in the compaction container when the compaction container moves from the first orientation to the second orientation.

22. The press of claim 20 further comprising a die positioned at the second open end and having a die opening configured to receive material to be extruded therethrough.

* * * * *